United States Patent

Simmons

[15] 3,701,956
[45] Oct. 31, 1972

[54] METHOD OF AN APPARATUS FOR GENERATING ULTRA-SHORT TIME-DURATION LASER PULSES

[72] Inventor: William W. Simmons, Palos Verdes Peninsula, Calif.

[73] Assignee: TRW Inc., Redondo Beach, Calif.

[22] Filed: May 14, 1971

[21] Appl. No.: 143,515

[52] U.S. Cl. .................................331/94.5, 350/160
[51] Int. Cl. .................................................H01s 3/11
[58] Field of Search .....................331/94.5; 350/160

[56] References Cited

UNITED STATES PATENTS

| | | | |
|---|---|---|---|
| 3,508,164 | 4/1970 | Uchida | 331/94.5 |
| 3,521,069 | 7/1970 | De Maria et al. | 331/94.5 |
| 3,521,188 | 7/1970 | Sooy | 331/94.5 |
| 3,564,450 | 2/1971 | Immarco et al. | 331/94.5 |
| 3,564,454 | 2/1971 | Hook et al. | 331/94.5 |
| 3,571,744 | 3/1971 | Hook et al. | 331/94.5 |
| 3,577,097 | 5/1971 | Hilberg | 331/94.5 |

Primary Examiner—William L. Sikes
Attorney—Daniel T. Anderson, Edwin A. Oser and Jerry A. Dinardo

[57] ABSTRACT

Both a method and an apparatus are disclosed for generating laser pulses having a time duration on the order of subnanoseconds. These light pulses also have a high output power. They are generated by causing a laser to lase and removing the bulk of the radiation contained in the laser cavity. The remaining radiation or light extends over only a short length of the cavity. This light pulse is mode locked, that is it consists of individual Fourier components of the proper phase so that the short light pulse retains its shape while being amplified again in the laser cavity. This short-duration light pulse may then be made to issue from the cavity. Alternatively, the amplified light may be made to issue as a pulse train or set of pulses. Finally, a single pulse may be utilized for mode locking another laser where the ultra-short time-duration pulse may be amplified again. This may be considered priming and subsequent mode locking of the second laser.

10 Claims, 7 Drawing Figures

PATENTED OCT 31 1972
3,701,956
SHEET 1 OF 2
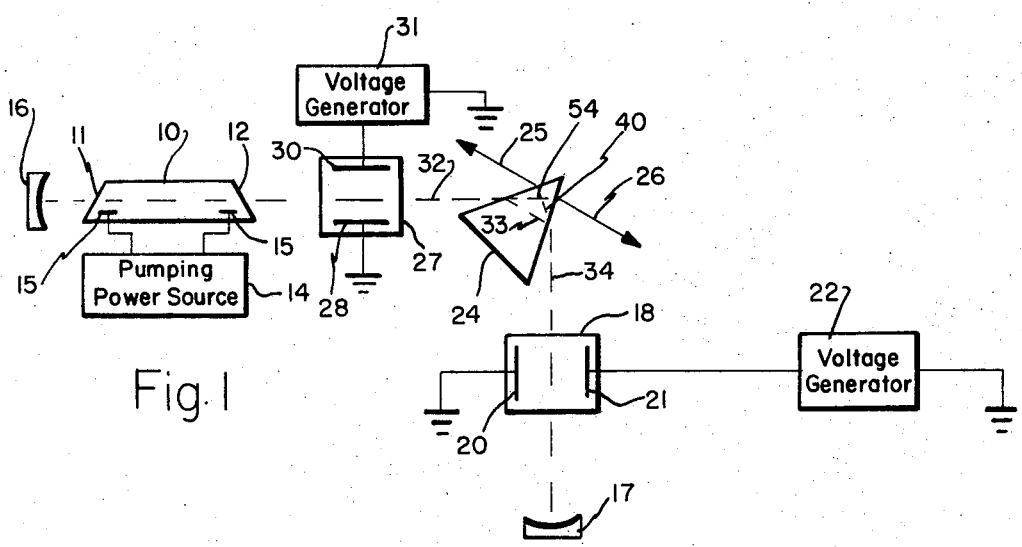
Fig. 1
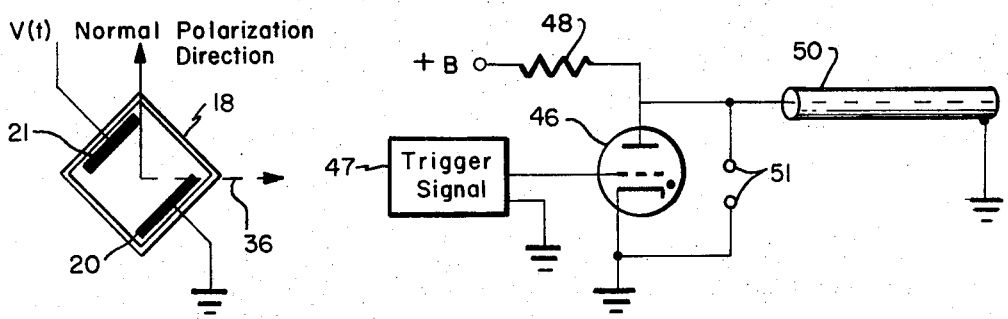
Fig. 2
Fig. 4
Fig. 5
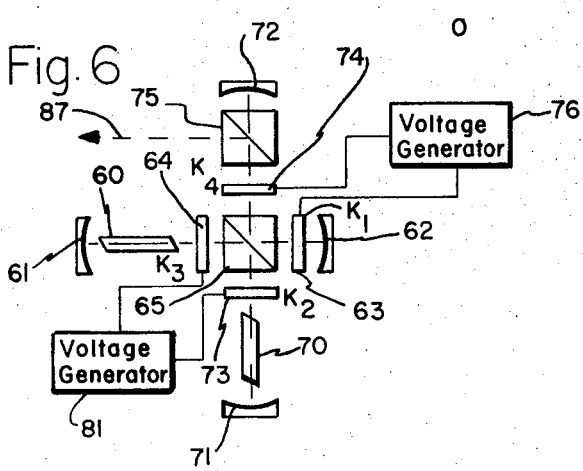
Fig. 6
William W. Simmons
*INVENTOR.*
BY *Edi L. Osey*
ATTORNEY

METHOD OF AN APPARATUS FOR GENERATING ULTRA-SHORT TIME-DURATION LASER PULSES

BACKGROUND OF THE INVENTION

This invention relates generally to lasers, and particularly to a laser so operated as to generate a pulse having a subnanosecond time duration.

For many applications it is desirable to operate a laser in such a manner that it generates output pulses of large energy having a time duration on the order of nanoseconds or even less. However, in the past it has been difficult, if not impossible, to generate a light pulse having a duration in the subnanosecond region which also has a high output power.

It is known to operate lasers by time-variable reflectivity. Such a laser has been disclosed and claimed in a U.S. Pat. No. 3,571,744 which issued on Mar. 23, 1971 to Hook and Dishington and is entitled "Laser Incorporating Time Variable Reflectivity." This patent is assigned to the assignee of the present application. The laser is initially made to lase in a conventional manner. Subsequently, by means of Q switching all the light contained in the laser cavity is reflected or refracted out of the laser cavity. This may, for example, be effected by changing the polarization of the light in such a manner that all the light contained in the cavity is switched out of the cavity by a birefringent prism or the like. In that case, obviously the time duration of the light pulse can be no less than the time duration of the light passing from one end of the cavity to the other and back again to its origin, that is the time it takes light to pass twice the length of the cavity.

Thus the time duration of such a light pulse may be in the order of a few nanoseconds and its amplitude or energy is relatively high. However, it is not possible to reduce the time duration of the light pulse obtained with such a time-variable reflectivity laser.

Another scheme for generating giant laser pulses of short time duration has been disclosed in a patent to Witte and Frantz U.S. Pat. No. 3,506,927 and entitled "Selected Mode Giant Pulse Laser." This patent is also assigned to the assignee of the present invention. It is proposed here to inject a radiation signal or pulse from a first laser into a second laser thereby to amplify only oscillations of a desired mode group. Accordingly the Witte and Franz giant pulse laser operates by injection locking of the power laser.

It is accordingly an object of the present invention to provide a method of and apparatus for generating laser pulses having a time duration on the order of subnanoseconds.

Another object of the present invention is to provide a practical method of injection locking of a laser for the purpose of generating ultra-short time-duration light pulses of high power.

A further object of the present invention is to generate an amplified light pulse in the laser cavity which is short compared to the length of the laser cavity by mode locking of the laser.

SUMMARY OF THE INVENTION

In accordance with the present invention a method is provided of operating a laser to generate a pulse of radiation having an ultra-short time duration. To this end the laser which has an optical cavity is caused to lase until the cavity is substantially filled with radiation. Thereafter the bulk of the radiation contained in the cavity is removed. As a result radiation remaining in the cavity extends only over a short length of the cavity. The radiation remaining in the cavity is now amplified by laser action to develop an amplified, short-duration pulse. This is made possible because the pulse has Fourier components which match the Fabry-Perot resonances of the cavity. Thus the short time pulse may be considered to consist of radiation components extending over a certain frequency range and having such phase relationships that the laser is mode locked. Therefore, the pulse remains together while it is reflected back and forth between the mirrors defining the cavity of the laser and while the pulse is being amplified. Finally, the short pulse which is at a high power level is utilized.

This may be effected by causing the short-duration pulse to issue from the cavity. Alternatively it is feasible to issue a pulse train consisting of a series of amplified pulses. Finally the short duration pulse may be utilized for triggering or priming another laser, that is, for injection locking the second laser. The second laser may be arranged to have high amplification to produce an output pulse with the same short duration but having even a higher energy level.

The novel features that are considered characteristic of this invention are set forth with particularlity in the appended claims. The invention itself, however, both as to its organization and method of operation, as well as additional objects and advantages thereof, will best be understood from the following description when read in connection with the accompanying drawings.

BRIEF DESCRIPTION OF THE DRAWINGS

FIG. 1 is a schematic representation, partly in block form, of a laser system in accordance with the present invention for generating an ultra-short time-duration pulse;

FIG. 2 is an end elevational view of a Kerr cell which may be used with the laser FIG. 1;

FIG. 4 is a circuit diagram, partly in block form, illustrating by way of example a voltage generator for generating very short time duration pulses which may be used with the laser of FIG. 1;

FIG. 5 is a chart illustrating the optical power as a function of time within the cavity of a laser when the laser is operated in a particular way to change the relative mode phasing of the light remaining in the cavity;

FIG. 6 is a schematic representation, partly in block form, of a modified laser system in accordance with the present invention for injecting a light pulse generated in a first laser into a second laser for further amplification of the mode-locked pulse.

DESCRIPTION OF THE PREFERRED EMBODIMENTS

Figure 3:
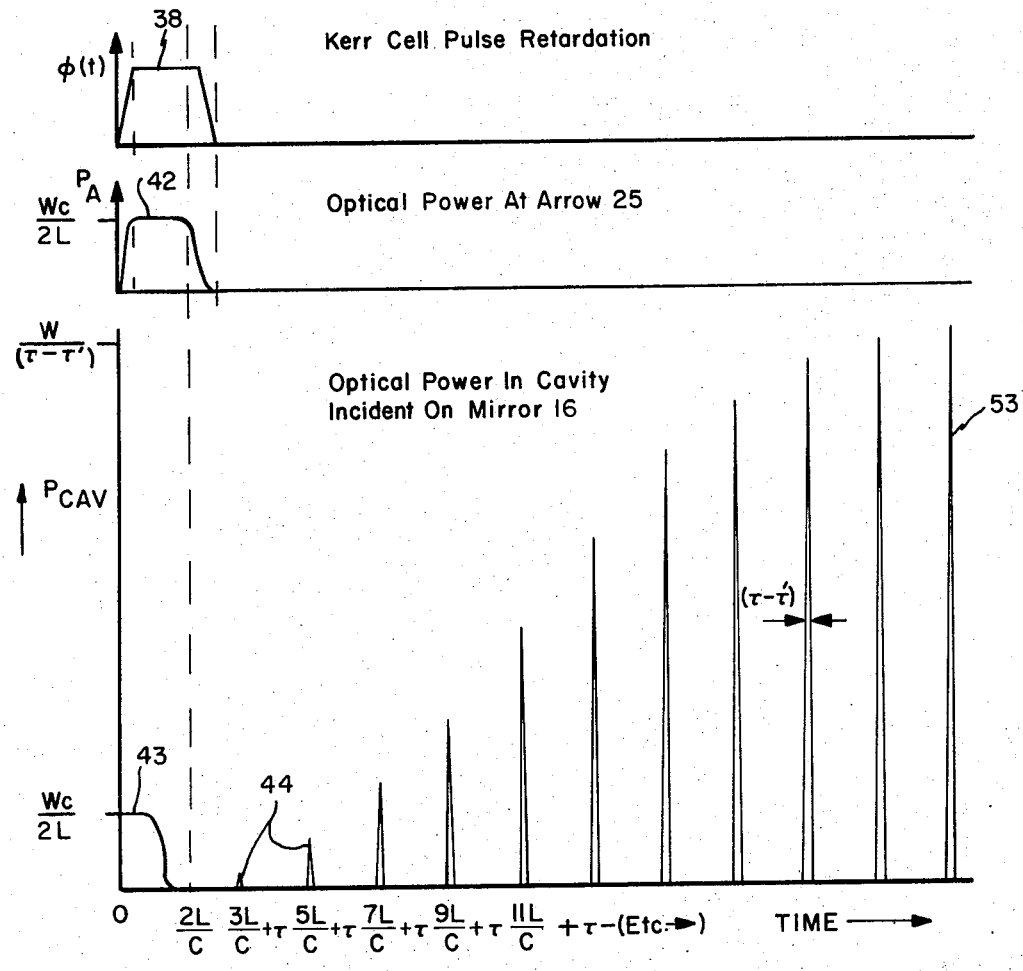
FIG. 3 is a chart of a series of pulses representing light wave retardation and optical power in the cavity of the laser of FIG. 1 as a function of time.

Referring now to the drawings, and particularly to FIG. 1, there is illustrated a laser system for generating high-power, ultra-short time-duration pulses in a accordance with the present invention. The laser system of FIG. 1 includes a laser generally indicated at 10. The laser may, for example, be a gaseous laser as shown and may be provided with a pair of windows 11 and 12 arranged at the Brewster angle to minimize reflection of the laser light. Also the light passing through the Brewster windows 11 or 12 will be linearly polarized. However, it should be understood that any conventional laser may be substituted for the gaseous laser 10 such, for example, as a solid state laser. The laser is provided with a pumping power source 14 which may be connected for example in the case of a gaseous laser to a pair of electrodes 15 immersed in the gas. However, it will be understood that in the case of a solid state laser, the pumping power source 14 may energize, for example, a flash lamp for optical pumping of the laser.

The optical cavity is defined by a pair of mirrors 16 and 17. The mirrors may, for example, be spherical mirrors as shown which facilitates adjustment of the cavity. However, it is feasible instead to use mirrors with plane surfaces. Preferably the two mirrors 16 and 17 are coated at their opposed surfaces. This may, for example, be effected by a suitable dielectric coating. In general, the mirrors 16 and 17 should be made completely reflecting. In practice they may have a reflectivity of about 99 percent.

Further disposed in the optical cavity is an electro-optical element 18 which may, for example, consist of a Kerr cell as shown or alternatively of a Pockels cell or of an acoustic cell. In general any electro-optical device may be used which is capable of changing the polarization of light passing therethrough in response to an applied voltage or the like signal. Thus the electro-optical element 18 such as a Kerr cell may be provided with two electrodes 20 and 21 one of which is grounded while the other one is connected to a voltage generator 22. The voltage developed by the generator 22 will be discussed hereinafter in connection with FIG. 3.

Further disposed in the optical cavity is a birefringent element 24 which may, for example, consist of a calcite prism as shown. However, any birefringent element may be substituted therefor. It has the purpose of refracting the light passing therethrough selectively either between mirrors 16 and 17 or in the direction of arrows 25 or 26 depending on the polarization of the light passing therethrough. To this end it must be assumed that the light reflected between mirrors 16 and 17 has a normal direction of polarization. If the light issued by the laser 10 is not normally so polarized this may be effected by a suitable polarizer interposed, for example, between laser 10 and Kerr cell 18. However, the light passing a laser having windows 11 and 12 disposed at the Brewster angle will automatically be linearly polarized.

It will be noted that the calcite prism 24 refracts the light so that a cavity is used consisting of two branches disposed substantially at right angles to each other with the prism 24 at the intersection of the two cavities. However, this particular arrangement of the optical cavity is not essential for the operation of a laser system in accordance with the present invention. Thus the laser of FIG. 6 which will be discussed later on consists of two optical cavities each being disposed along a single line and intersecting each other at right angles.

The laser system of FIG. 1 may optionally be provided with a second electro-optical element 27 which may be identical with the element 18 and may consist of a Kerr cell as shown. It also has a pair of electrodes 28 and 30 one of which is grounded as shown while the other one is connected to a voltage generator 31 which may be similar to the voltage generator 22.

Thus with the normal direction of polarization of the light, the light will move in the direction shown by the dotted line 32 through the prism 24 as shown by line 33 and will be refracted out of the prism as shown by the line 34. The laser is permitted to lase by energizing it through the pumping power source 14. This is continued until the entire lasing cavity is filled with light radiation reflected back and forth between mirrors 16 and 17. Thus the light power builds up to some steady-state optical radiation level. This may be denoted by the lasing energy W and it may be assumed that this energy is uniformly distributed throughout the cavity. The cavity may have a length L so that the optical power flow in one direction is as follows: $Wc/2L$, where $c$ is the velocity of light.

After this steady state has been reached a voltage pulse $V(t)$ is applied by the voltage generator 22 to the Kerr cell 18. This voltage pulse should have a very fast rise time. This is more clearly shown in FIG. 2 which may be considered to be an end view of the Kerr cell 18 so that the light passes through the cell 18 in a direction at right angles to the paper plane. The normal polarization direction is shown in FIG. 2 by the arrow. Accordingly, the voltage $V(t)$ creates a new polarization component as shown by the dotted arrow 36. This polarization component is in the direction of the horizontal plane. It will be assumed for the following discussion that the light passes twice through the Kerr cell 18. To this end the Kerr cell 18 may be disposed close to one of the mirrors such as 17. A fractional component of the light in the horizontal direction may be represented as follows: $A \sin(\phi/2)$, where $\phi$ is the phase delay introduced by the voltage applied to the Kerr cell 18. This phase delay or retardation of the light due to the Kerr cell is shown in FIG. 3 at 38. As shown here it preferably has a steep rise and fall time and is substantially flat topped. It also has a very short time duration as will be more fully explained hereinafter.

Due to the application of the voltage pulse to the Kerr cell the light wave passing through the Kerr cell 18 is retarded as shown at 38 in FIG. 3. This in turn will change the polarization of the light so that the light passing through the prism 24 is refracted as shown by the dotted line 40 and emerges as shown in the direction of arrow 25.

If all the light contained in the optical cavity is removed by the pulse applied to the Kerr cell 18 the operation is like that of a conventional time variable reflectivity laser as disclosed in the previously referred to patent to Hook and Dishington. However, in accordance with the present invention not all of the radiant energy contained in the cavity is removed or dumped. Thus the electrical pulse applied to the Kerr cell 18 should be sufficiently short so that radiant energy in a localized portion of the cavity remains in the cavity. What is desired is that the remaining light in the cavity is localized in the form of an optical pulse. It occupies a region in the cavity having a length of $c(\tau-\tau')$ $<<L$, where $\tau$ is the rise or fall time of the electrical pulse $V(t)$. Further $\tau - \tau'$ is the time duration of the light pulse. $\tau - \tau' \cong 2L/c \cdot 1/N$, where N is the total number of modes of the light pulse.

This remaining light pulse now passes back and forth by reflection between the mirrors 16 and 17. During this time, of course, the laser 10 is continuously pumped by the pumping power source 14. As a result the circulating pulse is amplified every time it passes through the laser 10. After a number of passes of the pulse it has again built up to its maximum power level as the laser approaches again its steady-state operating condition. It may now be assumed that the laser has again arrived at an energy content W and the peak power of the optical pulse is given by the following relationship $$W/(\tau-\tau') >> Wc/2L. \quad (1)$$

Essentially the energy of the amplified pulse is substantially identical with the energy of all the radiation initially contained in the laser cavity.

Referring again to FIG. 3, curve 42 illustrates the optical power at the arrow 25 which is removed from the laser system. The curve 43 of FIG. 3 illustrates the power remaining in the cavity and incident on mirror 16. The subsequent pulses shown generally at 44 illustrate the successively amplified pulses which are reflected back and forth between mirror 16 and 17. As also shown in FIG. 3 the time duration of each of the light pulses is $\tau - \tau'$. It should also be noted that their amplitudes increase much beyond the amplitude curve of 43 until they reach the level of the relationship (1). The light pulses follow each other at time intervals of $2L/c$.

Relationship (1) is strictly true only if the laser functions as a distortion-free amplifier while the amplitude of the pulses increase as shown in 44. Actual experiments have shown that the optical pulse spreads somewhat as the laser approaches saturation or its steady-state condition.

It should be noted that the time duration of pulse 42 is on the order of 3 to 4 nanoseconds (nsec). This is the usual limit of an output pulse obtained from a time variable reflectivity laser. On the other hand the time duration corresponding to $\tau - \tau'$ is on the order of 0.3 nsec for an argon ion laser which is at least an order of magnitude shorter in duration.

In general the peak power $P_p$ of the pulse remaining in the cavity is given by the following formula:

$$P_v = \frac{Wc}{2L}\left(\frac{\pi}{2}\right)^4 \left(\frac{\tau-\tau'}{\tau}\right)^4 \quad (2)$$

and the energy content $\Delta W$ of the pulse is given as follows:

$$\Delta W = \frac{W}{30}\left(\frac{\pi}{2}\right)^4 \left(\frac{c\tau}{2L}\right)\left(1-\frac{\tau'}{\tau}\right)^5 \quad (3)$$

It should be noted that $\Delta W$ should be larger than the spontaneous emission energy of the laser during the pulse duration time. This, of course, is the energy of radiation created by a spontaneous emission in the laser.

FIG. 4 to which reference is now made shows an example of a voltage generator which may be used for generating an electrical pulse of the required time duration which may be on the order of a few nsec. The circuit of FIG. 4 includes a gas filled tube such, for example, as a thyratron 46 having its cathode grounded while it control grid is connected to a trigger signal source 47. The anode may be connected to a positive voltage supply +B through a resistor 48. Further connected to the anode of the thyratron 46 may be a coaxial transmission line 50 having its far end short-circuited and grounded. Such a transmission line will reflect any pulse applied to it within a time period determined by the velocity of the pulse through the transmission line, and its length. Thus it is possible to develop a pulse having a very short duration by the use of a short transmission line. The output terminals 51 may be connected respectively to the anode of thyratron 46 and ground.

As indicated before the short light pulse remaining in accordance with the present invention in the laser cavity consists of many oscillating laser modes of the proper phase with respect to each other. Thus the pulse may have a frequency spectrum extending over a range of a few gigacycles. This pulse may be considered to have Fourier components which match the Fabry-Perot resonances of the optical cavity formed by the two mirrors 16 and 17.

The amplified pulse such as pulse 53 created after sufficient amplification in the optical cavity may then be made to issue from the laser by now energizing the Kerr cell 27 by applying thereto a short time pulse with the voltage generator 31. This will change the polarization of the light in such a manner that the light entering the prism 24 as shown by the dotted line 32 is refracted as shown by the dotted line 54 and emerges in the direction of arrow 26 where it may be utilized.

Alternatively it is feasible to make one of the mirrors 16 or 17 only partially reflective so that it may have a reflectivity say of 50 to 60 percent. In that case the light may be made to issue say from the mirror 17. In that case instead of obtaining a single light pulse 53 a train of light pulses is obtained somewhat like the set of pulses shown in FIG. 3 at 44. This train of optical pulses may have a fractional nanosecond duration for each pulse and a repetition period of $2L/c$ which may be on the order of 100 Mc.

Instead of applying one pulse to the Kerr cell 18 by means of voltage generator 22 to initiate the amplification of the short pulses and a second pulse to the Kerr cell 27 by means of the voltage generator 31 to issue the amplified pulse, it is also feasible to utilize only a single electro-optical cell such as a cell 18. In this case two separate voltage pulses must be applied to the same electro-optical cell, the two pulses being separated and timed properly to permit the short time-duration pulse to be amplified sufficiently.

While it may be difficult to operate a single Kerr cell with the required double electric pulse by means of thyratrons it is feasible to obtain such an operation, for example, with a Pockels cell and improved electronic components such as a KN-6 Krytron tube instead of a thyratron.

So far the discussion concerned the localization of the optical energy in as small a space as possible within the optical cavity. This, of course, will achieve maximum output pulse power. However, variation of the applied voltage to the Kerr cell 18 changes the relative mode phasing of the light remaining in the cavity. This in turn dramatically affects the envelope of the laser recovery. Thus a curve such as shown in 55 in FIG. 5 has been obtained. This depicts the one way optical power flow within the cavity as a function of time. The envelope is in the form of an electronic stairstep wave and rises according to an approximate exponential. The time duration of each step is again $2L/c$. A curve such as shown in 55 in FIG. 5 may be obtained if enough light is left within the cavity to fill substantially the entire cavity.

The ultra-short time-duration laser pulse generated in accordance with the present invention may also be used for injection locking a second power laser. Thus a first laser may be utilized to generate the pulse while a second laser with a high amplification may be utilized to further amplify the pulse. This is generally similar to mode locking of a laser. The high amplification laser is primed by a short pulse. This can be accomplished with the laser system shown in FIG. 6 to which reference is now made.

The laser system of FIG. 6 consists essentially of two lasers having their cavities disposed at right angles to each other.

The first laser 60 is enclosed by pass the pair of mirrors 61 and 62 which together form an optical cavity extending along a straight line. A first Kerr cell 63 designated $K_1$ and a second Kerr cell 64 designated $K_3$ are disposed in the optical cavity formed by the two mirrors 61 and 62. A birefringent double prism 65 such as a Glan-Thompson polarizer forms the intersection between the first and the second laser cavity. The purpose of the double prism 65 is to either the light straight through the prism or to reflect it at right angles depending on the state of polarization of the light passing therethrough.

The second laser system includes a laser 70 disposed in an optical cavity formed by mirrors 71 and 72. Again two Kerr cells 73 and 74 are disposed in the optical cavity and are designated respectively $K_2$ and $K_4$. Finally another birefringent double prism or Glan-Thompson polarizer 75 is provided in the second laser cavity to permit light to be ejected out of the cavity.

The first laser defined by mirror 61 and 62 may be operated in the manner previously disclosed. Thus the light is initially polarized say by the Brewster windows of the laser 60 in such a manner that the light passes straight through the prism 65. The first Kerr cell $K_1$ is initially energized by a voltage generator 76 to develop a voltage pulse as shown at 77 in FIG. 7. This will change the polarization of the light in such a manner that the bulk of the light is ejected out of the cavity 61, 62 by the prism 65 into the cavity 71, 72. However, at that time the second laser 70 is not being pumped so that this light is not being amplified. Furthermore, the second cavity 71, 72 has a low Q so that its light is ejected out of the cavity by prism 75 as shown by arrow 87.

As a result, a short pulse remains in the cavity 61, 62. This amplified pulse train such as shown in 78 in FIG. 7 is generated in the first cavity 61, 62 and is designated as $P_{12}$.

Figure 7:
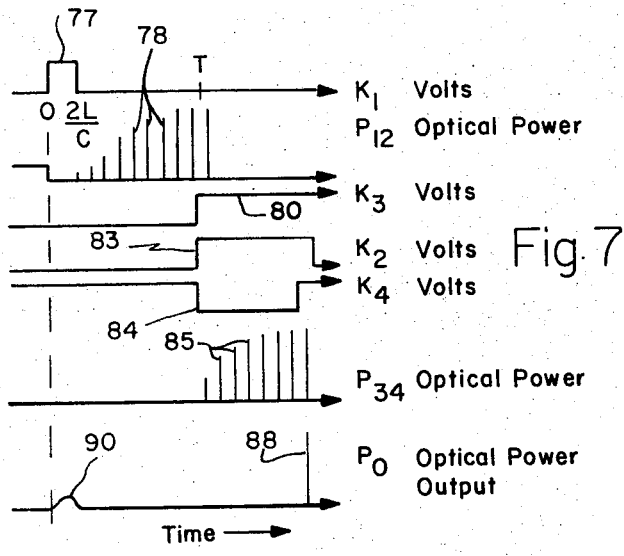
FIG. 7 is a set of curves plotted as a function of time to illustrate the voltages applied to various Kerr cells of the system of FIG. 6 as well as the optical power remaining in the two laser cavities of the system of FIG. 6.

A sufficiently amplified light pulse is now removed from the first laser cavity 61, 62 by applying a step voltage 80 to the Kerr cell $K_3$ as shown in FIG. 7. This voltage may be applied by the voltage generator 81 connected to the Kerr cell $K_3$. This will now change the polarization of the light in such a manner that the light is reflected at right angles by prism 65 and injected into the laser cavity 71, 72.

At the same time the laser cavity 71, 72 is Q-switched by the voltages 83 and 84 applied respectively to the Kerr cells $K_2$ and $K_4$. These voltages may be generated by the voltage generators 81 and 76 connected to the respective Kerr cells. The voltage 84 applied to the Kerr cell $K_4$ changes the polarization of the light to permit it to pass through prism 75 between mirrors 71, 72. The voltage pulse 83 changes the polarization of injected light to permit it to pass through prism 65 between mirrors 71, 72. The laser 70 has previously been pumped to a high inversion of its population just prior to the time T, that is prior to the time of the voltage pulses 83 and 84.

Accordingly the injected laser pulse is amplified in the optical cavity 71, 72 as shown by the pulse train 85 of FIG. 7 designated $P_3$.

The optical output power is now obtained by removing the voltage that was previously applied to the Kerr cell $K_4$ as shown by the voltage wave 84. This will now change the polarization of the light so that the light is reflected by the prism 75 in the direction of arrow 87. The resulting output pulse 88 is also shown in FIG. 7. At this time the voltage wave 85 may again be removed from the Kerr cell $K_2$. It will be noted that a low-amplitude optical pulse 90 is also shown in FIG. 7 as the optical power output. This corresponds to the light energy which was initially dumped from the laser cavity 61, 62 into the laser cavity 71, 72 and which appears in the direction of output arrow 87.

There has thus been disclosed a method of and apparatus for generating laser pulses having an ultra-short time duration. In spite of their short duration, on the order of less than 1 nanosecond, the pulses can be made to have a substantial output power. It is feasible either to generate a single pulse or to provide a pulse train of lesser power. Alternatively it is feasible to provide optical pulses which increase in amplitude in the manner of a stairstep wave and which have a time duration each corresponding to the time it takes light to traverse the optical cavity twice. Finally the ultra-short duration output pulses may be used for injection locking a second power laser which in turn may further amplify the original pulse. The advantage of the laser system of the invention is that the output pulses have a time duration of less than a nanosecond while still having a power or energy corresponding to that of the pulses obtained, for example, by time variable reflectivity. They may also be used for injection mode locking which is generally rather difficult to accomplish.

What is claimed is:

1. The method of operating a laser to generate a pulse of radiation having an ultra-short time duration, said method comprising the steps of:
   a. causing a laser having an optical cavity to lase, thereby substantially filling the cavity with radiation;

b. removing radiation contained in the cavity for a predetermined time period less than 2 L/c, where L is the length of the optical cavity and c the velocity of the radiation so that radiation remains in the cavity extending only over a short length of the cavity;

c. continuing to amplify the radiation remaining in the cavity to develop an amplified short-duration pulse; and d. removing the amplified pulse from the laser cavity.

2. The method as defined in claim 1 wherein a portion of each of a series of amplified pulses is removed from the laser, each pulse having a duration short compared to 2 L/c.

3. The method defined in claim 1 wherein the removed amplified pulse is injected into another laser for injection mode-locking and further amplification.

4. The method of operating a laser to generate a stairstep waveform of radiation, said method comprising the steps of:

a. causing a laser having an optical cavity to lase, thereby substantially to fill the cavity with radiation;

b. causing the radiation to have a first predetermined direction of polarization;

c. causing radiation having a second predetermined direction of radiation to be removed from the cavity;

d. removing a portion of the radiation contained in the cavity by rotating the first direction of polarization of the radiation into a third direction of polarization for a predetermined period of time less than 2 L/c, where L is the length of the optical cavity and c is the velocity of the radiation, the third direction of polarization being between the first and the second direction of polarization whereby a portion, but not all of the radiation, is removed from the cavity during the predetermined period of time, whereby a low energy level remains in a portion of the length of the cavity said substantially all of the energy of the radiation remains in the cavity for a period of time of 2 L/c less the predetermined period of time;

e. amplifying the radiation remaining in the cavity and having a power of the shape of a stairway flowing within the cavity; and f. removing the amplified radiation from the cavity.

5. Apparatus for generating an ultra-short time-duration pulse, said apparatus comprising:

a. an optical cavity defined by a pair of substantially completely reflecting mirrors;

b. a laser disposed in said cavity;

c. means for pumping said laser to cause it to lase;

d. an electro-optical element disposed in said cavity, said element being capable of changing the polarization of light passing therethrough in response to an applied voltage;

e. a birefringent element disposed in said cavity, said birefringent element being normally arranged for passing light having a first predetermined polarization from one of said mirrors to the other and being capable of refracting light having a second predetermined polarization out of said cavity;

f. a signal generator coupled to said electro-optical element for applying thereto a signal having a predetermined time duration of less than 2 L/c, where L is the distance between said mirrors and c is the velocity of light, whereby the polarization of the light passing through said laser is changed from said first to said second predetermined polarization so as to cause said birefringent element to reflect said light out of said cavity during said predetermined time duration; and g. continuing to maintain said means for pumping energized, thereby to amplify the light pulse remaining in said cavity having a length short compared to that of said cavity.

6. Apparatus for generating an ultra-short time-duration pulse, said apparatus comprising:

a. an optical cavity defined by a pair of substantially completely reflecting mirrors, said mirrors being so positioned as to form two branches forming an angle with each other;

b. a laser disposed in one of said branches;

c. means for pumping said laser to cause it to lase;

d. an electro-optical element disposed in one of said branches, said element being capable of changing the polarization of light passing therethrough in response to an applied voltage;

e. a birefringent prism disposed at the intersection of said branches of said cavity, said prism being normally arranged for refracting light having a first predetermined polarization from one of said branches to the other and being capable of refracting light having a second predetermined polarization out of said cavity;

f. a voltage generator coupled to said element for applying thereto a pulse having a predetermined time duration of less than 2 L/c, where L is the length of said cavity and c is the velocity of light, whereby the polarization of the light passing through said element is changed from said first to said second predetermined polarization so as to cause said prism to reflect said light out of said cavity for said predetermined time duration; and g. continuing to maintain said means for pumping energized thereby to amplify the light remaining within said cavity and having a length short compared to that of said cavity.

7. Apparatus as defined in claim 6 wherein said voltage generator develops a second short time-duration pulse for permitting the amplified radiation in said cavity to issue from said cavity.

8. Apparatus as defined in claim 6 wherein said electro-optical element consists of two Kerr cells, each being disposed in one of said branches and wherein said voltage generator is coupled to one of said Kerr cells, and an additional voltage generator coupled to the other one of said Kerr cells, said additional voltage generator developing a second short time-duration pulse for causing the amplified radiation in said cavity to issue out of said cavity.

9. Apparatus as defined in claim 6 wherein one of said mirrors is partially transparent, thereby to issue a train of amplified pulses after said light has been refracted out of said cavity.

10. Apparatus as defined in claim 6 wherein said pulse of predetermined duration has such a voltage that the polarization of the light passing through said element is changed to a value between that of said first and said second predetermined polarization, whereby a portion of all of the light in said cavity remains in said laser while all of the light for said predetermined time duration remains in said cavity to form a mode-phased pulse capable of generating an amplified wave within said cavity of generally stairstep power shape.

* * * * *